United States Patent
Parisien et al.

(10) Patent No.: US 9,479,434 B2
(45) Date of Patent: Oct. 25, 2016

(54) VIRTUAL DESTINATION IDENTIFICATION FOR RAPIDIO NETWORK ELEMENTS

(71) Applicant: Fabric Embedded Tools Corporation, Kanata, Ontario (CA)

(72) Inventors: Jim Parisien, Kanata (CA); David Alexander Gilmour, Almonte (CA)

(73) Assignee: Fabric Embedded Tools Corporation, Kanata, Ontario (CA)

( * ) Notice: Subject to any disclaimer, the term of this patent is extended or adjusted under 35 U.S.C. 154(b) by 511 days.

(21) Appl. No.: 13/946,427

(22) Filed: Jul. 19, 2013

(65) Prior Publication Data
US 2015/0023154 A1    Jan. 22, 2015

(51) Int. Cl.
| H04L 12/741 | (2013.01) |
| H04L 12/707 | (2013.01) |
| H04L 12/703 | (2013.01) |
| H04L 12/26 | (2006.01) |

(52) U.S. Cl.
CPC ............... *H04L 45/54* (2013.01); *H04L 45/22* (2013.01); *H04L 45/28* (2013.01); *H04L 43/0847* (2013.01); *H04L 43/50* (2013.01)

(58) Field of Classification Search
None
See application file for complete search history.

(56) References Cited

U.S. PATENT DOCUMENTS

| 7,826,450 B2* | 11/2010 | Lin | H04L 45/00 370/390 |
| 2006/0026275 A1* | 2/2006 | Gilmour | H04L 41/22 709/223 |
| 2006/0109845 A1* | 5/2006 | Sandy | H04L 12/4633 370/389 |
| 2007/0253329 A1* | 11/2007 | Rooholamini | H04Q 3/54558 370/220 |
| 2008/0117908 A1* | 5/2008 | Kuo | H04L 69/22 370/392 |
| 2015/0138958 A1* | 5/2015 | Shao | H04L 43/0811 370/228 |

* cited by examiner

*Primary Examiner* — Chirag Shah
*Assistant Examiner* — Srinivasa Reddivalam
(74) *Attorney, Agent, or Firm* — Teitelbaum & MacLean; Neil Teitelbaum; Doug MacLean (57) ABSTRACT

A method of dynamically redirecting traffic in a RapidIO network, which includes a host processor, a plurality of endpoints, and a plurality of switches. The method comprises assigning a "virtual" destination ID (VDID) to each endpoint, after each endpoint has already been provided with an original Destination ID and an original path has been mapped for each pair of endpoints in accordance with the RapidIO protocol, i.e. the routing tables in appropriate switches have been populated with output instructions for packets with specific Destination IDs. Accordingly, one or more redundant routing paths can be programmed into the routing tables of appropriate switches between each pair of endpoints, different than the original path therebetween. The switches can therefore steer the packets with VDIDs along redundant routing paths, to avoid damaged links, access isolated switches and/or perform loopback transmissions without having the switches routing tables reprogrammed.

20 Claims, 6 Drawing Sheets

VIRTUAL DESTINATION IDENTIFICATION FOR RAPIDIO NETWORK ELEMENTS

TECHNICAL FIELD

The present invention relates to a system for providing RapidIO network elements virtual destination identification, and in particular to a system enabling dynamic reorganization, switch access, and loop back features in a Rapid IO network.

BACKGROUND OF THE INVENTION

Figure 1:
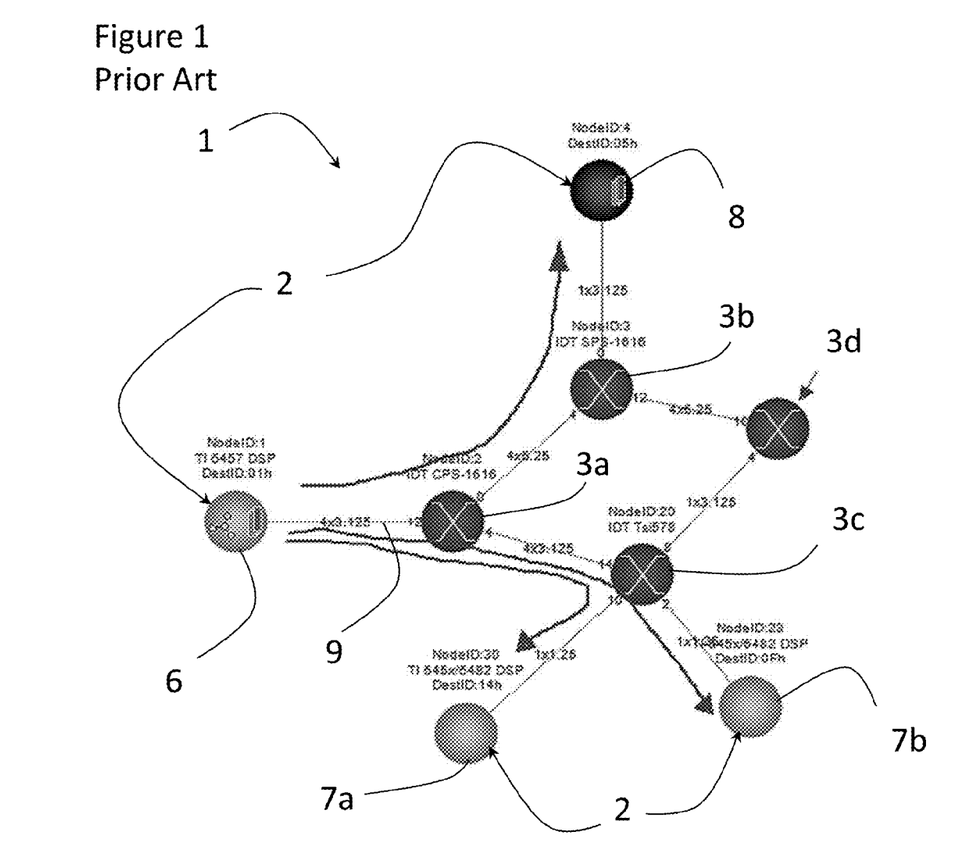
FIG. 1 illustrates a convention RapidIO network.

RapidIO is a packet based protocol. With reference to FIG. 1, there are two primary elements in a RapidIO network 1; endpoints 2 and switches 3a to 3d. Endpoints 2, such as memory, processors and bridges, can receive or transmit data packets, whereas switches 3 route the packets from endpoint 2 to endpoint 2.

A host processor 6 is defined within the RapidIO specification as the system host processor that performs a variety of system duties, such as discovery, enumeration, and initialization. In RapidIO there is typically only one system host processor 6. It may be possible to initially have two or more system hosts in RapidIO, but the first activity these system hosts must perform is determining which is the primary system host; at which point, all non-primary hosts' functions will go dormant and the primary system host 6 will perform system host duties as if it is the only host in the system. To that end, discussions within this document will refer to the "host" as the primary system host processor. Any processor in a RapidIO network can assume the role of host; there are no specific or unique hardware characteristics that distinguish a host from any other processor, only software function determines who is host.

A processing element (PE) is defined within the RapidIO specification to describe any node within a RapidIO network 1. A PE can represent the host processor 6, a bridge 7a or 7b, the switches 3a to 3d, a memory device 8, or combination thereof.

An endpoint 2 is defined within the RapidIO specification to generically describe any device, such as the processor 6, the bridge 7a or 7b, or the memory 8, which terminates the RapidIO protocol, unlike the switches 3a to 3d, which re-directs packets through the network 1.

A destination ID is defined within the RapidIO specification as an 8 bit or 16 bit unique identifier for each endpoint 2 in the network 1. Each endpoint 2 has one base destination ID register. Under normal operation, a PE will only accept packets whose header contains a destination ID value that matches the value stored in the PEs base destination ID register.

A packet comprises a header and a data payload. The header contains a variety of control information including priority, addressing, and the destination ID.

A multicast destination ID is defined within the RapidIO specification as one or more optional non-unique identifier(s) for each endpoint 2 in the network 1. A PE will only accept multicast packets, whose header contains a destination ID value that matches the value stored in any of the PEs multicast destination ID registers.

A link is defined within the RapidIO specification as a physical connection between any two PEs. A RapidIO link is a full duplex serial connection defined by a width (number of lanes) and speed (baud rate in Gbps) parameter, e.g. link 9 is defined as having 4 lanes, each with a baud rate of 3.125 Gbps.

Discovery is a process defined within the RapidIO specification wherein the host processor 6 steps through each node within the RapidIO network 1, and determines what type of device each node is, and how each node is connected to other devices in the network 1. Maintenance packets are transmitted to each PE to first determine what kind of device each PE is, e.g. switch, bridge, memory. Acknowledgement packets are returned to the host processor 6 with the initial information. Knowing the make and model of the PE, enables the host processor 6 to access basic information about the PE in its database of information for commercial devices stored in memory, but also to further interrogate the device's maintenance registers to determine other properties, e.g. routing table size, maximum number of switch ports, transaction types supported. Subsequent maintenance packets from the host processor 6 then interrogate the PE for more specific details, e.g. ports enabled. After each PE is discovered, additional maintenance packets are sent out to adjacent PE's, and the same process is repeated until the entire network is discovered, i.e. a map of the entire network with each device's connections and capabilities are stored in non-volatile memory accessible by the host processor 6.

Enumeration is a process defined within the RapidIO specification wherein the host processor 6 assigns a unique destination ID to every endpoint 2 within the network 1, which is also stored in memory accessible by the host processor 6.

Initialization is a process defined within the RapidIO specification wherein the host processor 6 initializes registers within the PEs during or following the discovery process. Enumeration is a specific type of initialization. Often initialization includes configuring routing tables within each switch 3 with the newly enumerated destination ID values, setting up various link speed or width values etc. Accordingly, for each pair of endpoints 2, a single path is determined, and the routing tables of the switches 3a to 3d therebetween are programmed to direct packets bearing a specific destination ID entering a specific input port to a specific output port.

To send a packet from one processor endpoint 2 to another in a RapidIO network, two primary requirements must be met: 1) a unique device address or destination ID (DID) for each processor endpoint 2, and 2) a pre-programmed path for the packet to flow through the switch network 1.

There is a specific register in each processor, called the based device ID register, to house the destination ID of each endpoint 2, and each switch 3a to 3d contains routing tables to guide each packet through the switch 3a to 3d using the destination ID within the packet as a lookup pointer to direct the packet to the appropriate egress port of the switch 3a to 3d. For example: to send a message from the host processor 6 to the memory endpoint 8, first, packets are generated in the host processor 6 and given destination ID 05h, i.e. the destination ID of the memory endpoint 8. The packet is then sent to the switch 3a via input port 12. Since the network 1 has already been initialized and enumerated, the switch 3a accesses its routing table and routes the packet with destination ID 05h from input port 12 to output port 0 towards the switch 3b. Similarly, the switch 3b, having received the packet at input port 4 with destination ID 05h accesses its routing table, and routes the packet from input port 4 to output port 0 towards the memory endpoint 8. Accordingly, the packet does not need to have the designated path stored therein, as the network, e.g. switches 3a to 3d, route the packets based on the destination ID, the input port, and the predetermined routing table assignments.

The RapidIO protocol has defined a packet routing mechanism that allows one endpoint 2 to send out a packet that is destined to multiple endpoints. This is similar to what other protocols term a "broadcast" with the exception that a broadcast typically sends out a packet to all endpoints whereas "multicast" by RapidIO's definition sends out a packet to a predetermined subset of all endpoints 2.

Switches 3a to 3d can be configured to associate a specific destination ID as a multicast destination ID, so when a packet enters a switch 3a to 3d with a destination ID that matches a pre-defined multicast destination ID, the packet is replicated and sent out multiple egress ports simultaneously. Multiple endpoints 2 would have one of their multicast destination ID registers set to the same value, i.e. that of the destination ID of the multicasted packet, so that multiple endpoints 2 can accept this packet. Therefore, while destination IDs assigned to endpoints 2 need to be unique, multicast destination ID registers in endpoints 2 are not unique.

To receive a multicast packet, the endpoint 2 must support one or more multicast registers, and the value of the destination ID of the packet must match the value programmed into one of the endpoints' multicast destination ID registers. However, multicast support is optional in endpoints 2, and not all endpoints 2 have multicast capabilities.

In normal operation, only packets that contain a destination ID that matches the value programmed into the endpoint's destination ID register or multicast destination ID registers, in the case of a multicast packet, will be accepted and processed by an endpoint 2. All other packets are discarded.

Some endpoints 2 support a non-standard "accept all mode", wherein, if programmed accordingly, the endpoint 2 will accept and process any packet that reaches it, regardless of the destination ID. However, "accept all mode" is a non-RapidIO protocol feature that is supported by only some endpoint manufacturers.

Switches 3a to 3d and endpoints 2 have many maintenance registers within them that allow things such as destination IDs and routing tables to be programmed. Unlike data packets previously described, which go from endpoint 2 to endpoint 2, maintenance packets are small control packets used specifically to program device registers.

Since switches 3a to 3d, which do not have destination IDs, contain many registers, the only way to address a packet to a switch 3a to 3d according to the RapidIO specification is to use a different mechanism than what is used for a data packet. The concept of HOP count is defined in RapidIO to identify the number of devices a maintenance packet must traverse before it reaches its destination. Furthermore, the maintenance packet uses a destination ID of an endpoint 2 within the network 1 whose path happens to pass through the switch 3a to 3d being addressed so that an appropriate path for the packet can be used.

Accordingly, a maintenance packet destined for a switch, e.g. switch 3c, from the host processor 6 is provided with the destination ID, e.g. 0Fh, of an endpoint, e.g. bridge 7b, in a previously mapped path including the switches 3a and 3c and the endpoint 7b, and a HOP count, e.g. 1, based on the number of devices the maintenance packet must traverse to get to the switch, e.g. switch 3c. When the switch, e.g. switch 3a, receives the maintenance packet, it looks at the HOP count value. If it is non-zero, it decrements the HOP count value in the maintenance packet, looks up the output port, e.g. output port 4, on the routing table using the destination ID, e.g. 0Fh, of the packet, and sends the packet on its way. If the maintenance packet's HOP count is zero, the switch, e.g. switch 3c, accepts and processes the packet as if destined for itself. HOP counts are a very awkward mechanism that causes numerous problems within RapidIO, as is further explained hereinafter.

Since there are often no pre-existing routes in place following initial hardware power up, a discovery processes is initiated to find all of the devices within a system, enumerate all of the endpoints 2 with a unique destination ID, determine how they are interconnected, e.g. via switches 3a to 3d, and ultimately configure all of the routing paths from endpoint 2 to endpoint 2.

The discovery process relies on the use of maintenance packets; however, since the endpoints 2 have yet to be assigned destination IDs, no routes exist. All endpoints 2 power up with default destination IDs of 0xFF and all routing tables within switches 3a to 3d either have random data or are reset to a known value possibly 0x0. Therefore, it is impossible to utilize the normal method of an existing routing path to an endpoint 2 or through a switch 3a to 3d to address a specific device.

Instead a cumbersome method must be used of manually steering maintenance packets through a system as follows:
1) use a value of 0xFF, which is the default power up destination ID of any endpoint 2, as the destination ID in any maintenance packet;
2) use a value of 0x1 as the destination ID of the host processor 6;
3) for each switch 3a to 3d encountered, program the ingress port routing table location for destination ID 0xFF to exit the switch 3a to 3d on whichever egress port (M) is to be explored next, e.g. according to user guidance or preprogrammed order;
4) program the ingress port routing table for port (M) on switch 3a to 3d with a destination ID of 0x1 (the host processor's destination ID) so that a response packet from a potential link partner will be directed back to the host processor 6;
5) using HOP count to control how deep your maintenance packets travel into the network before reaching its destination; and
6) reprogramming routing table entries for destination ID 0xFF, so the host processor 6 can navigate maintenance packets to or through each device in a network, without relying on existing routing paths.

The host processor 6 must keep track of each switch 3a to 3d encountered, and how the ingress and egress routing tables of every port have been programmed, so that the network 1 is accurately mapped. The host processor 6 must also enumerate each endpoint 2, and eventually go back to each switch 3a to 3d and configure the routing tables for each enumerated destination ID.

Only after the discovery process is complete can the run time approach of addressing maintenance packets using existing routes to endpoints 2 be used.

There are several deficiencies with the RapidIO protocol as it was intended to be used. For example: Dynamic Realignment, i.e. when a link fails, or transmission errors increase indicating link failure is imminent, or increased traffic on a link results in reduced throughput, it is desirable to change routes on the fly to avoid the problematic link. RapidIO does not have a mechanism that can allow for dynamic or adaptive route changes in real time. Currently, what is required in RapidIO is that: 1) transmission of data within potentially the entire system is halted; 2) routing tables in all switches are reprogrammed to include the new routing paths around the failed or failing link; and then 3) all transmission of data can be re-started The above approach has a significant negative impact to quality of service of the system. Alternatively, a duplicate redundant system of some sort must be available, in order to perform a complete fail over to the redundant system in real time, which is how RapidIO systems today handle a link failure or significant link throughput loss while performing packet retransmissions due to errors. A redundant system is an expensive and power intensive solution, and is also a very complex programming sequence to perform, if quality of service impacts are to be minimized or eliminated. These are the common solutions used today and far from ideal as they are significantly impactful on system performance, cost and/or power.

Another shortcoming of the RapidIO protocol is the existence of isolated switches. Since maintenance registers within each switch 3a to 3d must be accessed using maintenance packets with a hop count and the destination ID of an existing endpoint 2, the path to the endpoint 2 must traverse through the switch 3a to 3d. This is often a problem as paths between endpoints 2 are usually chosen based on the shortest path to minimize transmission latencies. Therefore, it is not uncommon to have an "isolated switch", i.e. no endpoints 2 are connected directly to the switch and no routes to other endpoints 2 go through the switch, such as the isolated switch 3d shown in FIG. 1. Accordingly, the internal registers of switch 3d would not accessible using the conventional run time addressing approach.

Isolated switches, e.g. switch 3d, present a very awkward and cumbersome mechanism to manage during hot plug events, i.e. live insertion of new boards, or potential re-routing possibilities within the system should link failures occur in other parts of the system.

The only way to access registers in isolated switches, is to use the same slow manual mechanism of steering a packet using a fixed Destination ID of 0xFF during discovery for example. Not only is this a slow and complicated process to perform simple operations such as reading registers in an isolated switch, but it has the potential of interfering with normal data flow within a network as modifications to routing tables while data is flowing through a switch is often not recommended.

A third shortcoming of the Rapid IO protocol is the inability to perform loop back testing. A very common system validation technique in networks is to allow a processor that is required to do system verification at power up, or during system operation, to send packets out through various parts of a system and then back to itself. This "loop back" method is a commonly used and simple way to validate that all paths in a system are intact and operating at peak performance.

Unfortunately, loop back testing is not possible using conventional techniques in a RapidIO network, as this would require an endpoint 2 to be capable of sending data to itself, and to not affect any valid routing of return packets from other endpoints 2. Most endpoint hardware will not allow an outgoing packet to be addressed to itself. Further, each other endpoint 2 in a system will typically have a route in place to return packets to the endpoint 2, so creating a loop using its standard destination ID will damage those existing return routing paths.

Figure 2:
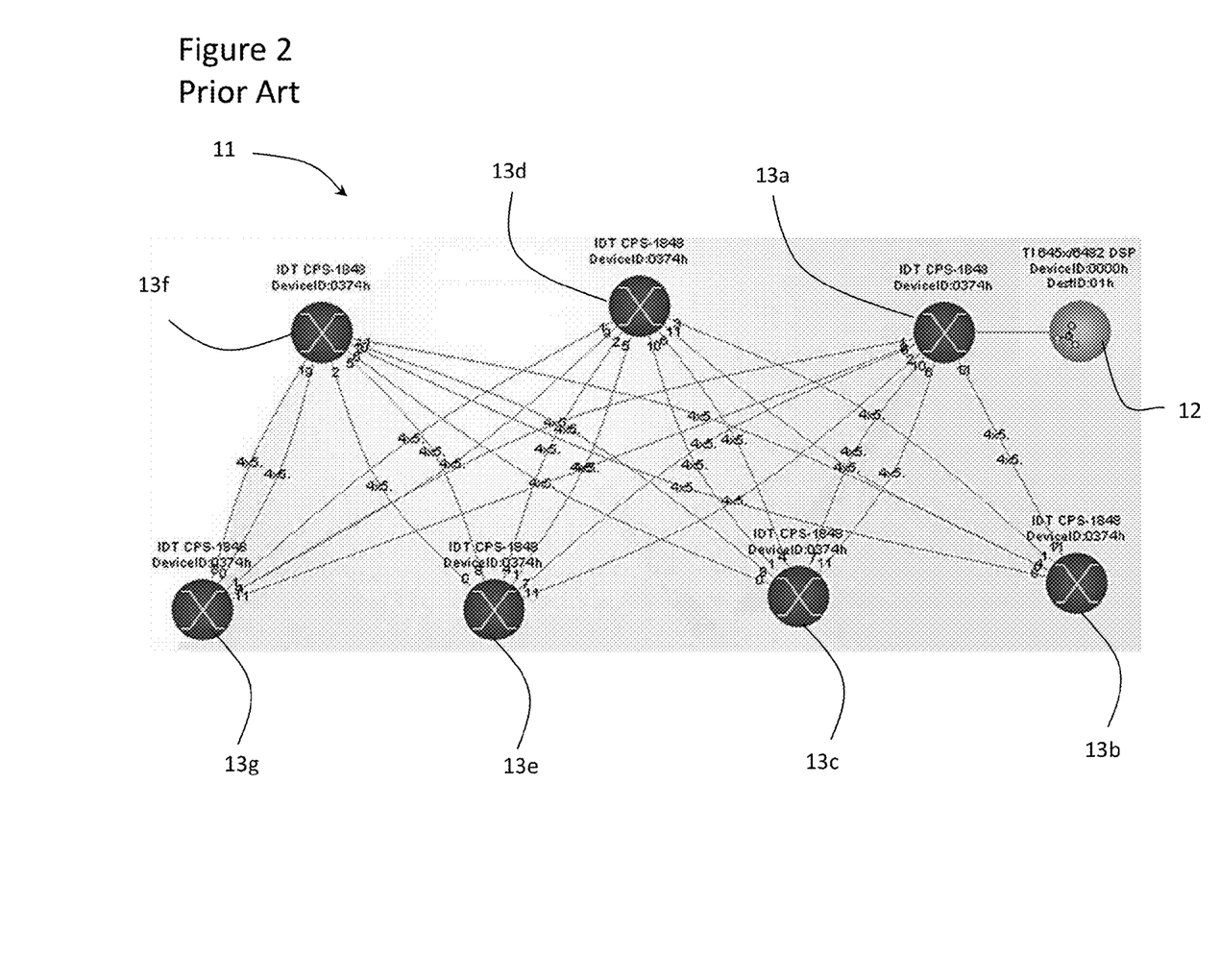
FIG. 2 illustrates a convention RapidIO full mesh switch card.

For system verification of a full mesh switch card 11, i.e. every switch 13a to 13g has a connection to every other switch 13a to 13g with only one endpoint 12, as in FIG. 2, loop back testing is impossible to do with the RapidIO protocol using conventional means as there are no other endpoints in the system and therefore no destination IDs to utilize as routing paths through any of the switches 13a to 13b. Unfortunately, the full mesh card 11 has many loops that are desired to be validated, but RapidIO protocol's limitations makes this impossible using conventional means.

An object of the present invention is to overcome the shortcomings of the prior art by providing each processing element in a RapidIO network virtual, or alternative, destination ID addresses, so that alternative paths can be dynamically reconfigured, loop-back testing can be performed, and switches can be accessed relatively easily.

SUMMARY OF THE INVENTION

Accordingly, the present invention relates to a method of establishing additional routing paths in a RapidIO network, which comprises a plurality of processing elements including a host processor, a plurality of endpoints, and a plurality of switches, the method comprising:
 a) assigning a virtual destination ID (VDID) to selected processing elements, in addition to each endpoint having been provided with an original Destination ID and an original path having been mapped for each pair of endpoints in accordance with the RapidIO protocol;
 b) generating an additional routing path between each pair of selected processing elements, different than the original path therebetween;
 c) adding routing table entries to the plurality of switches for the VDIDs for steering packets with VDIDs along the additional routing paths; and
 d) storing the VDIDs in in the host processor.

Another aspect of the present invention relates to a RapidIO network comprising:
 a host processor;
 a plurality of endpoints, each endpoint having an original destination ID defining an original path between itself and each of other endpoints; and
 a plurality of switches, each with a routing table for routing packets along the original path according to the original destination IDs;
 wherein a plurality of redundant routing paths between each endpoint, and a Virtual Destination ID (VDID) to each of the redundant routing paths are stored in the host processor, and the routing table in each switch include entries for packets with Virtual Destination IDs; and
 wherein the host processor is configured to dynamically, and in real time, alter the path packets are transmitted between two endpoints to one of the redundant routing paths using one of the VDIDs for a given endpoint in the packets header, when the original path has degraded in performance below a predetermined threshold.

Another feature of the present invention provides an apparatus comprising: a non-transitory memory having an application program stored in the non-transitory memory; a computer coupled to the non-transitory memory, the application program when executed on the computer causing the computer to perform operations comprising: the aforementioned method.

BRIEF DESCRIPTION OF THE DRAWINGS

The invention will be described in greater detail with reference to the accompanying drawings which represent preferred embodiments thereof, wherein.

DETAILED DESCRIPTION

The above problems exist because destination-based packet-routing systems, such as RapidIO, only define one path between an originating endpoint and a final endpoint based on the final endpoint's lone destination ID and routing tables preprogrammed and stored in individual switches positioned between the two endpoints. Accordingly, it is not possible using conventional means in a RapidIO network for the path between two endpoints to be dynamically altered, an endpoint to send data to itself, and to enumerate switches with a destination ID.

Figure 3:
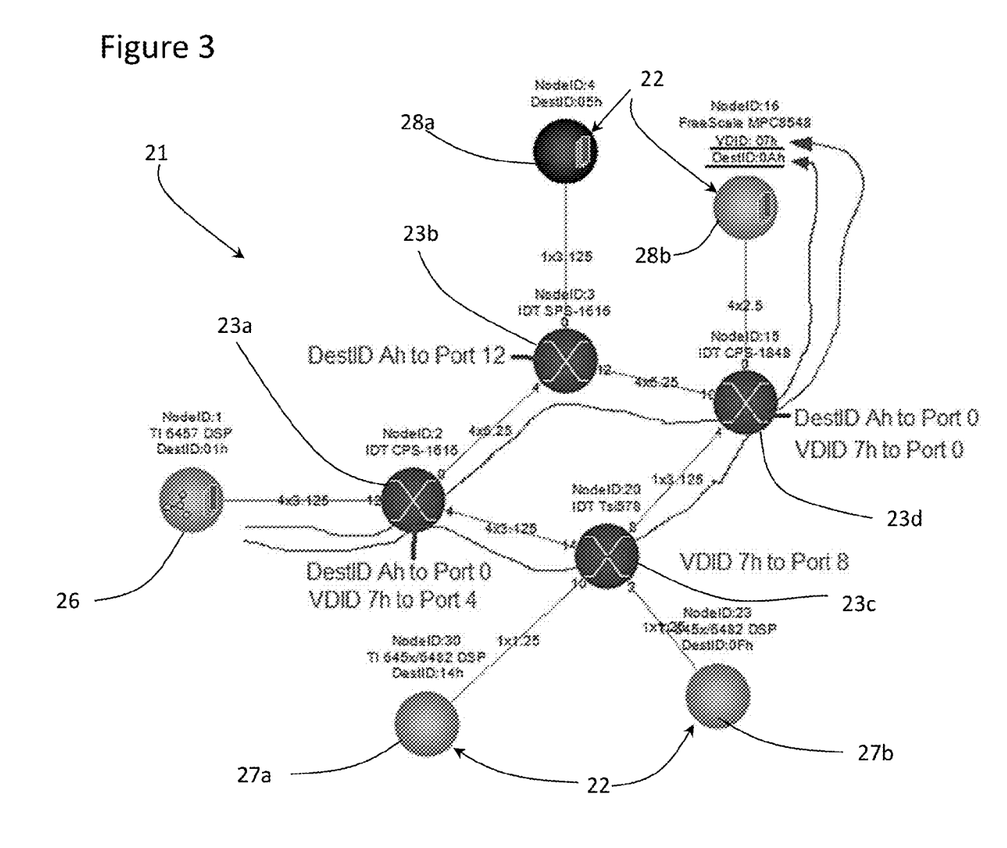
FIG. 3 illustrates a RapidIO network in accordance with the present invention.

With reference to FIG. 3, the concept of virtual destination IDs (VDIDs), in accordance with the present invention, is incorporated into a RapidIO network 21, which included endpoints 22, switches 23a to 23d, and host processor 26. The endpoints 22 can be any form of endpoint, as hereinbefore discussed, but for illustrative purposes are defined as bridges 27a and 27b, and memory 28a and 28b. The VDIDs solve the above problems because use of additional or alternative (virtual) destination IDs 1) enables: the host processor 26 to define multiple paths between any two endpoints 22, 2) permits an endpoint 22 to send data to itself, and 3) enables the enumeration of switches 23a to 23d.

VDIDs can be implemented by a VDID system host software stored in non-volatile memory accessible and executable by the system host processor 26, and by utilizing several existing RapidIO and/or non-standard existing features that are intended to be used for other purposes. Accordingly, the VDID system host software programs alternative virtual paths for one or more VDIDs by programming the switch routing tables in switches 23a to 23d with input and output port selections for each VDID that are different from the original input and output port assignments, whereby any packets programmed with a VDID will travel a different path as the packets with the original destination ID. To accomplish this, the VDID software running in the host processor 26 must reassign the use of endpoint Multicast Destination IDs in the endpoints 22 that support them, and/or the endpoints Accept All mode Destination IDs in the endpoints that support them, as VDID registers. Further the host processor software must predefine packet alternate routing paths with each switch using the VDIDs.

In the illustrated embodiment in FIG. 3, an original path between the host processor 26 and the memory 28b for destination ID 0Ah extends through switch 23a (input port 12 to output port 9), switch 23b (input port 4 to output port 12) and switch 23d (input port 10 to output port 0). The routing table assignments are listed in brackets after each switch. However, for VDID 07h the alternate path extends through switch 23a (input port 12 to output port 4), switch 23c (input port 14 to output port 8), and switch 23d (input port 4 to output port 0).

Lastly, in order to effectively take advantage of the alternate paths made available by the VDIDs, a system processor, typically the host processor 26, must perform system testing to detect a network problem, e.g. failure of a link or a reduction in transmission capacity of a link below a predetermined threshold (e.g. below 40%, below 50% or below 75% of capacity). However, instead of failing to another redundant mirrored system, or shutting down the network as every routing table in each switch is modified, as in the prior art, each Endpoint 22 would be notified of an alternative route to use to bypass the problematic link wherever possible, and program the Destination ID of subsequent packets with a VDID that follows a path, which does not include the problematic link. Further, any Endpoint 22, whose Destination ID as stored in its Base Device ID register, would cause a response packet to traverse the degraded or failed link, would be informed to re-enumerate itself by swapping the Destination ID as stored in its Base Device ID register with one of its VDIDs which circumvents the problem link. For example: if the link between switches 23b and 23d were to fail, the host processor 26 would then instruct each of the endpoints 22, e.g. via a doorbell or message packet, to choose paths not including that particular link, and assign subsequent packets with VDIDs, instead of the originally enumerated destination ID, that are directed on the paths that do not include the failing link.

RapidIO has well understood mechanisms defined within the specification, or well understood proprietary mechanisms with switches wherein link throughput and error monitoring can take place allowing detection of packet errors to occur through the use of Maintenance packets. Further, there are many different mechanisms that can be defined, such as doorbell, message, or nWrite packets that allow Endpoints 22 to be notified that they should use an alternate path/VDID for any given Endpoint 22. It is not so important how the information is conveyed; what is important is that, using VDIDs, routing paths can be altered in real time without changing exiting routing tables and therefore disrupting ongoing system activities beyond the degraded or failed link.

Endpoints 22 can be assigned VDIDs by the host processor 26, if the endpoints 22 support Multicast Destination IDs (MDIDs) by utilizing specially designated MDIDs as VDIDs. In this case, normal use and routing of Multicast Destination IDs in a system for those specially designated Multicast Destination ID values and registers cannot be used. If all of an endpoint's Multicast Destination ID registers are utilized for VDIDs then the endpoint 22 cannot participate in the normal multicast capability as defined by the RapidIO specification. An endpoint 22 can support as many unique VDIDs as the number of Multicast registers it supports.

Alternatively, if an Endpoint 22 supports "Accept all" mode, the endpoint 22 can support almost any number of VDIDs, as long as an unused unique Destination ID value is available, which can be assigned as a VDID. For example, in the case of 8 bit Destination ID values in small domain systems, 256 unique values of Destination ID are available, and in the case of a 16 bit Destination ID 65,536 values—with the exception of a few reserved values such as 0x1, 0x2 for hosts, and 0xFF, 0xFE used for discovery and system boot memory. In the case of 16 bit Destination ID values used in large domain systems, over 64 thousand unique values are available for assignment with conventional Destination IDs or as VDIDs.

Using VDIDs and virtual routing paths, multiple unique paths can pre-exist from Endpoint 22 to Endpoint 22 so when a link fails, or as a link begins to degrade, the endpoint 22 sending the packet can simply use the alternate VDID (path) and instantly escape the troubled link, with no quality of service disruption. Further, after all routes through the failing link have been changed, steps can be taken to repair the link while the system continues to operate without interruption or down time for repair. The amount of redundancy that can be put in is a function of the available physical paths in a network 21 from one Endpoint 22 to another, as well as the number of VDIDs that are able to be assigned, i.e. whether the Endpoint 22 includes MDID registers or an Accept all mode where a packet with any Destination ID will be accepted.

Paths to switches 23a to 23d are only ever limited by the size of the Destination ID (8 bit or 16 bit) values used in a system or the size of the routing tables used within each switch 23a to 23d. For example, a system may be configured to support 16 bit Destination IDs within packet headers, however a switch may only support 10 bit routing tables, so the maximum number of unique Destination IDs (virtual or otherwise) is limited to 1024 in this example. Certainly endpoints that support an "accept all" mode offer the most versatility when applying the concept of VDIDs.

VDID assignments can be shared by the host processor 26 the same way conventional Destination IDs would be shared within the network 21 through use of shared memory, or nWrite, doorbell or message transactions. How the Destination IDs and the VDIDs are shared is not defined by the RapidIO specification, as it can vary from system to system based upon a system's needs or architects preference.

One possible scenario is that following system discovery, the system host processor 26 shares a table of enumerated Destination IDs and Virtual Destination IDs for each PE with every Endpoint 22 within the network 21. A primary "ID" or "routing path" is defined for each endpoint 22. Presumably, a common location in each Endpoint's memory has been pre-defined or messages are sent to predefined mailboxes with this enumeration/routing information. This same mechanism can be used to change the primary ID or routing path during operation if the host processor 26 detects a link degradation or fault.

It is even possible for each originating Endpoint 22 to monitor the primary paths that are important to it, and choose an alternative ID or routing path to avoid links that are degrading or overused. Multiple methods of detection and choosing alternative paths are possible and would be system dependent.

Some fixed systems today, do not perform a dynamic discovery at power up. The network topology is fixed, as is the number of Endpoints 22 and locations within the network 21. Each endpoint 22 has been pre-assigned a Destination ID by the system architect, or other authority, and routing tables have been "hardcoded" within the switches 23a to 23d. VDIDs are a natural extension to this approach as well. VDIDs can be assigned to each endpoint 22 and alternate paths hardcoded into routing tables as well. The system host processor 26, or each endpoint 22, can determine when alternate paths should be selected and used.

While RapidIO switches 23a to 23d do not contain Destination IDs, they can be assigned a Virtual Destination ID (VDID) by the host processor 26 and stored in the host processor's memory. Then a real route, i.e. routing table entries in interim switches, for this VDID can be put in place for every switch 23a to 23d in the network 21. This enables every switch 23a to 23d to be accessed directly by the system host processor 26 or any Endpoint 22 using the switch's VDID and appropriate HOP count, regardless of the existence of any other Endpoints 22 in the network 21 and independent of routing paths to Endpoints 22.

Unlike the Endpoints 22, that have maintenance registers and memory, the Switches 23a to 23d only have maintenance registers. So the Endpoints 22 can receive data packets and maintenance packets, but the Switch 23a to 23d can only receive maintenance packets. Accordingly, the RapidIO protocol uses an Endpoint's Destination ID, whose path happens to be routing through said switch.

According to the present invention, the use of a VDID for each Switch 23a to 23d enables maintenance packets to be sent to isolated switches, e.g. Switch 3d in FIG. 1, which are not yet in a path with an Endpoint 22 on the other side thereof. A switch that receives a maintenance packet looks at the HOP count. If it is 0 then the switch controller knows the packet is to be executed; if it is not 0, it decrements the HOP Count value and routes the packet along the path as dictated by the switch's routing table and the Destination ID value in the packet.

Further, just as with Endpoints 22, assigning multiple VDIDs for each switch 23a to 23d means that multiple redundant paths to each switch 23a to 23d can be predefined, ensuring convenient real time alternative routes to access any switch's maintenance registers. The convenient access to the switches 23a to 23d is critical if a system host processor 26 or any endpoint 22 is to monitor link performance.

Figure 4:
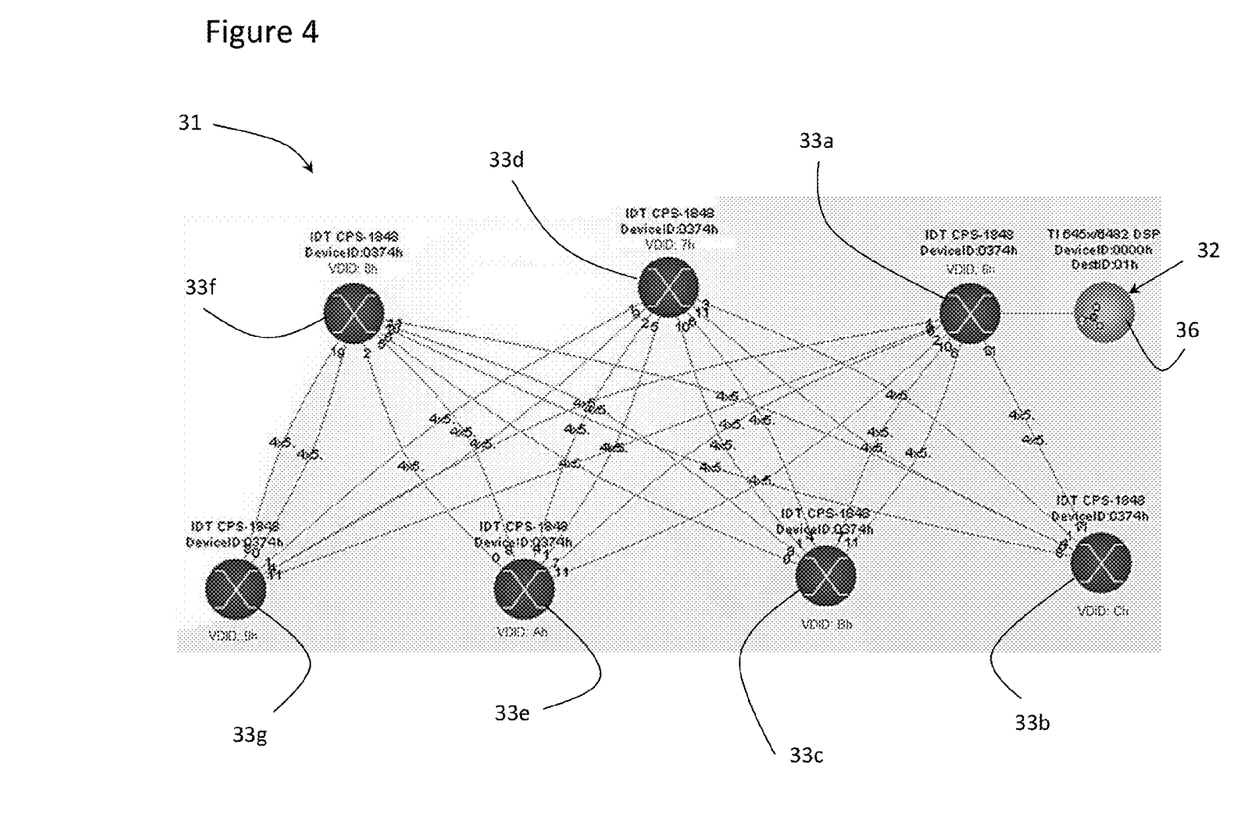
FIG. 4 illustrates a RapidIO full mesh switch card in accordance with the present invention.

With reference to FIG. 4, a mesh switch card 31, in accordance with the present invention includes a plurality of interconnected switches 33a to 33g, and a single endpoint 32 in the form of a host processor 36. In accordance with the present invention, the host processor 36 assigns VDIDs to each switch 33a to 33g, and generates and saves real routing paths from the host processor 36 to each switch 33a to 33g. Accordingly, any switch 33a to 33g can be accessed, e.g. by maintenance packets, from the host processor 36 regardless of the existence of any additional endpoints, i.e. the maintenance packets do not require a destination ID of an endpoint on the far side of the switch in question. This is key for conveniently accessing switch routing tables or monitoring switch link performance when no endpoints local to the switch 33a to 33g exist in the network 31. To access the switch 33c, the host processor 36 generates a maintenance packet with a VDID of Bh and a hop count of 1. When the maintenance packet reaches the first switch 33a, the switch 33a reads the hop count to ensure the maintenance packet is to be retransmitted, i.e. hop is non-zero, and then reduces the hop count by one, if it is to be retransmitted. Next, the routing tables are accessed for the VDID, and the maintenance packet is routed to the appropriate output port, e.g. output port 6. Upon receipt at the switch 33c, the hop count will be determined to be zero, and thus the maintenance packet will be processed accordingly by the switch 33c.

Figure 5:
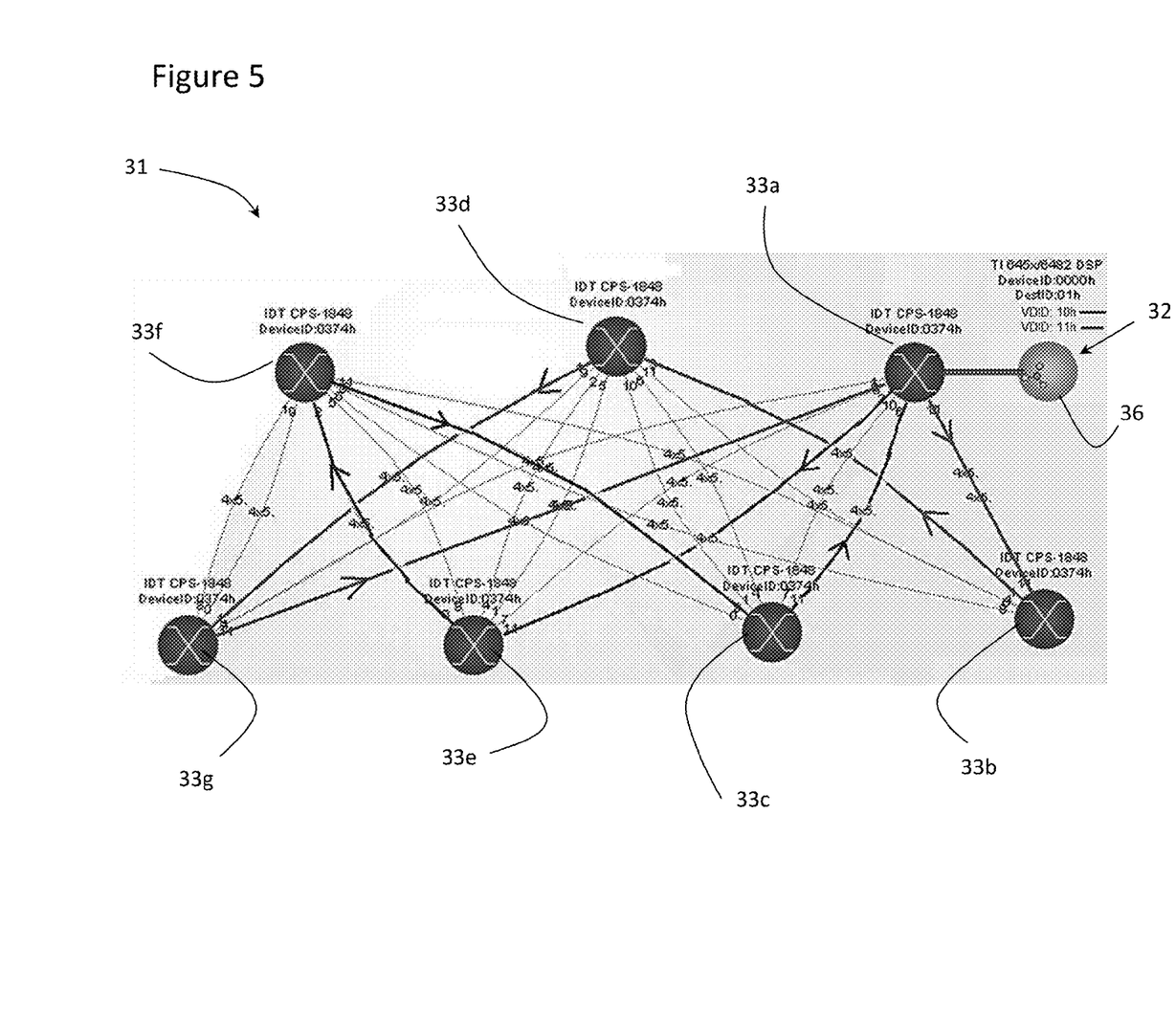
FIG. 5 illustrates the RapidIO full mesh card of FIG. 4 with loop back paths.

With reference to FIG. 5, since multiple VDIDs can be assigned to each endpoint 32, each endpoint 32 can send data to one of its own VDIDs, which will be initially interpreted by its hardware to be a device somewhere in the network 31. Since most switches 33a to 33g support separate routing tables for each of its ports, any number of different loop back paths are possible. For example: when the host processor 36 generates a maintenance packet with a VDID of 10h, i.e. one of its own VDIDs, the first switch 33a receives the maintenance packet, reduces the hop count, consults the routing table, and transmits the maintenance packet via output port 2 to the fifth switch 33e. Similarly, the fifth switch 33e receives the maintenance packet at input port 11, reduces the hop count, consults the routing table, and transmits the maintenance packet via output port 9 to the sixth switch 33f. The sixth switch 33f receives the maintenance packet at input port 2, reduces the hop count, consults the routing table, and transmits the maintenance packet via output port 8 to the third switch 33c, which receives the maintenance packet at input port 8, reduces the hop count, consults the routing table, and transmits the maintenance packet via output port 11 back to the first switch 33a. The first switch 33a receives the maintenance packet at input port 6, reduces the hop count, consults the routing table, and transmits the maintenance packet via output port back to the host processor 36. Accordingly, the host processor 36 can verify that all the switches are in operation, as well as all the links between the switches.

The main purpose of a loopback path is for detecting system problems. While a host can monitor switches throughout the network looking for transmission errors, which could indicate a link beginning to degrade and/or fail, some systems may not have data flowing in all paths at all times. So the host processor 36 can create its own test traffic, and not only be the recipient of the data it sends out, which it can therefore validate, but the host processor 36 can also monitor each switch 33a to 33g along the loopback path to ensure quality transmissions at each link along the way. Multiple loopback paths can ensure that all paths within the network 31 are traversed or at least that all the critical paths have been traversed.

The host processor 36 can perform this activity during normal system operation, or the testing can be a function that is distributed across multiple Endpoints 32, depending on how the system architect chooses to implement such a function. Either way, the host processor Endpoint 36 or many Endpoints 32 sharing results, the end function is the same; that of detecting and possibly repairing or diverting traffic away from problem areas. For loopback to be used during normal operation, the loopback paths, e.g. routing table entries in appropriate Switches 33a to 33d, would be predetermined, so that normal system operation is not interrupted by updating routing tables in order to change a loopback path.

However it might be different in the case of testing in the lab or during production testing. When in a test environment, disrupting system functions by downloading different loopback paths might not be an issue. So loopback paths do not have to necessarily be predetermined. The required paths may be added as part of a iterative process used while debugging a system.

The output port chosen for a packet's egress from each switch 33a to 33g is dependent upon the routing table located at the input port where the packet entered the switch, if per ingress port routing tables are used. It is possible on most switches 33a to 33b to use a global routing table instead, in which case the same routing table is essentially copied to each ingress port routing table thereby emulating a "global table".

So the per ingress port routing table is leveraged to specify the appropriate egress port (output port) and therefore multiple paths are created through the switch 33a to 33g that are dependent upon which port the packet came in on. As such, multiple loops, even through the same switch 33a to 33g, can be programmed for any given Destination ID or VDID.

The aforementioned example shows how each switch 33a to 33g can be validated using just two VDIDs. However, with more VDIDs, each link between each of the switches 33a to 33g can also be validated.

Discover Network: (New Method)

Figure 6:
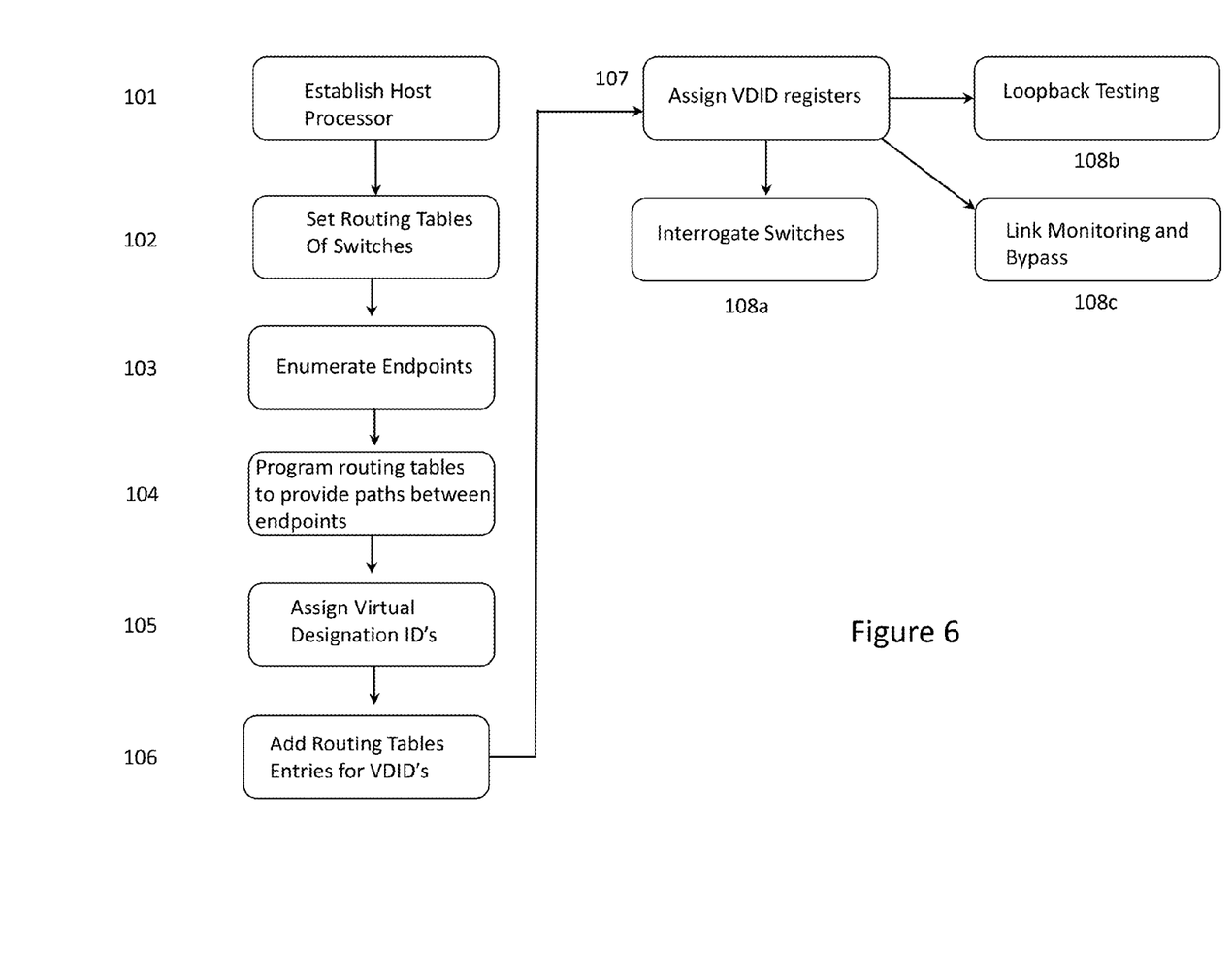
FIG. 6 is a flow chart of a method of utilizing virtual destination IDs in a RapidIO network in accordance with the present invention.

With reference to FIG. 6, a flow chart for the method in accordance with the present invention includes:

Establishing a host processor 26 in a network 21 at step 101, and launching maintenance packets from the host processor 26 with default destination IDs.

At step 102, using the maintenance packets to temporarily set routing tables to steer packets out an appropriate output port of each switch 23a to 23d encountered.

Enumerate each endpoint 22 as it is encountered with a unique Destination ID, at step 103.

Once the entire network 21 has been mapped and all endpoints 22 enumerated, all of the switch routing tables are programmed to allow an appropriate routing path between each pair of endpoints 22 based on a unique Destination ID per endpoint 22.

In step 105, the host processor 26 then assigns virtual Destination IDs to the endpoints 22 and the switches 23a to 23d.

Routing table entries are added in step 106 to each switch 23a to 23d as appropriate to create an additional routing path per VDID.

MDID registers or registers in "Accept All" endpoints are assigned VDIDs, e.g. using maintenance packets sent from host processor 26, in step 107.

The VDIDs can be assigned after the conventional Destination IDs are assigned or at the same time. Typically (or most efficiently) during discovery the abilities of each endpoint 22 are determined, and therefore how each endpoint 22 would be best programmed to support VDIDs, and both standard DestIDs and VDIDs are assigned as each endpoint 22 is encountered. At the end of the discovery process, the host processor 25 has determined what devices are in the network 21 and how they are interconnected, and has assigned DestIDs and VDIDs. Accordingly, the host processor 25 can then program all of the paths into the switches 23a to 23d, i.e. normal paths and redundant paths. In the case of the present invention, the host processor 26 can also modify the Virtual paths after the fact to "optimize traffic" across the network 21.

Any one or more of the following steps can be performed:

Step 108a maintenance packets can be sent from any endpoint 22 to one of the switches 23a to 23d utilizing the VDID of the switch along unique paths to the switches 23a to 23d independent of local endpoint routing paths.

Step 108b maintenance packets can be sent from any endpoint 22 with the VDID of the originating endpoint 22, whereby the packet follows a loop back path from the originating endpoint back to itself.

Step 108c the links in the network are continually monitored by the host processor 26 or other PE, and when a link is determined to be failing or failed, the endpoints 22 in the network 21 are instructed to use the additional redundant paths between endpoint pairs utilizing VDIDs to bypass the failing or failed links.

We claim:

1. A method of establishing additional routing paths in a RapidIO network, which comprises a plurality of processing elements including a host processor, a plurality of endpoints, and a plurality of switches, an original path having been mapped for each pair of endpoints in accordance with the RapidIO protocol, and each endpoint including an original Destination ID stored in a base ID register, the method comprising:

a) assigning a virtual destination ID (VDID) to selected processing elements, and storing the VDID in a register other than the base ID register or setting the selected processing elements to accept all packets;

b) generating an additional routing path, through processing elements and links already in operation, between each pair of selected processing elements, different than the original path therebetween, but to the same endpoint;

c) adding routing table entries to the plurality of switches for the VDIDs for steering packets with VDIDs along the additional routing paths;

d) storing the VDIDs in the host processor; and e) dynamically, and in real time, switching the transmission of signal packets from the original path to the additional routing path between two endpoints using the VDIDs corresponding to the additional routing path in the signal packets when the original path has degraded in performance below a predetermined threshold.

2. The method according to claim 1, further comprising using Multicast Destination ID (MDID) registers in MDID compatible endpoints to assign VDID's, such that each MDID compatible endpoint will accept a packet containing a matching VDID as the Destination ID.

3. The method according to claim 1, further comprising using Accept All Mode in Accept All Mode compatible endpoints to assign VDID's, such that each Accept All compatible endpoint will accept a packet containing a VDID as the Destination ID.

4. The method according to claim 1, wherein:
step a) includes assigning virtual destination IDs to the switches in the RapidIO network; and
step b) includes generating a plurality of additional routing paths between each endpoint and each switch using the Virtual Destination IDs.

5. The method according to claim 4, further comprising:
generating a data request packet at one of the endpoints, in which the data packet has a destination ID identical to one of the switch's VDID; and
sending the data packet to the one switch to access maintenance registers.

6. The method according to claim 5, further comprising sending a response packet back to the host processor with information about routing tables and ports in the switch.

7. The method according to claim 1, further comprising:
generating a test data packet at a first one of the endpoints, in which the data packet has a destination ID identical to the first endpoint's VDID;
transmitting the test data packet out into the network to at least one switch; and
setting the routing tables in the at least one switch so that the data packet is looped back.

8. The method according to claim 7, further comprising testing the network links and switches traversed by the test data packet based on the test data packet received back at the first endpoint.

9. An apparatus comprising: a non-transitory memory having an application program stored in the non-transitory memory; a computer coupled to the non-transitory memory, the application program when executed on the computer causing the computer to perform operations comprising: the method of claim 1.

10. A method of establishing additional routing paths in a RapidIO network, which comprises a plurality of processing elements including a host processor, a plurality of endpoints, and a plurality of switches, an original path having been mapped for each pair of endpoints in accordance with the RapidIO protocol, and each endpoint including an original Destination ID stored in a base ID register, the method comprising:

a) assigning a virtual destination ID (VDID) to selected processing elements, and storing the VDID in a register other than the base ID register or setting the selected processing elements to accept all packets;

b) generating an additional routing path, through processing elements and links already in operation, between each pair of selected processing elements, different than the original path therebetween, but to the same endpoint;

c) adding routing table entries to the plurality of switches for the VDIDs for steering packets with VDIDs along the additional routing paths;

d) storing the VDIDs in the host processor;

e) monitoring links between endpoints in the RapidIO network to determine if any link has degraded in performance below a predetermined threshold; and f) dynamically, and in real time, switching the transmission of signal packets from the original path to the additional routing path between two endpoints using the VDIDs corresponding to the additional routing path in the signal packets to bypass a link which has degraded in performance below the predetermined threshold.

11. The method according to claim 10, further comprising using Multicast Destination ID (MDID) registers in MDID compatible endpoints to assign VDID's, such that each MDID compatible endpoint will accept a packet containing a matching VDID as the Destination ID.

12. The method according to claim 10, further comprising using Accept All Mode in Accept All Mode compatible endpoints to assign VDID's, such that each Accept All compatible endpoint will accept a packet containing a VDID as the Destination ID.

13. The method according to claim 10, wherein:
step a) includes assigning virtual destination IDs to the switches in the RapidIO network; and
step b) includes generating a plurality of additional routing paths between each endpoint and each switch using the Virtual Destination IDs.

14. The method according to claim 13, further comprising:
generating a data request packet at one of the endpoints, in which the data packet has a destination ID identical to one of the switch's VDID; and
sending the data packet to the one switch to access maintenance registers.

15. A RapidIO network comprising:
a host processor, a plurality of processing elements, and a plurality of links interconnecting the processing elements;
a plurality of endpoints, each endpoint having an original destination ID, stored in a base ID register, defining an original path between itself and each of other endpoints, each endpoint including a Virtual Destination ID (VDID) stored in a register other than the base ID register or set to accept all packets, defining an additional routing path for each original path through different processing elements and links already in operation; and
wherein the plurality of processing elements includes a plurality of switches, each with a routing table for routing packets along the original path according to the original destination IDs;
wherein the additional routing paths between each endpoint, and the ft Virtual Destination ID (VDID) to each of the additional routing paths are stored in the host processor, and the routing table in each switch include entries for packets with Virtual Destination IDs; and wherein the host processor is configured to dynamically, and in real time, alter the path of packets that are transmitted between two endpoints to one of the additional routing paths using one of the VDIDs for a given endpoint in the packets header, when the original path has degraded in performance below a predetermined threshold.

16. The network according to claim 15, wherein Multicast Destination ID registers are used as Virtual Destination ID registers, such that each endpoint will accept a packet containing a matching Virtual Destination ID as the Destination ID.

17. The network according to claim 15, wherein a first end point is in an Accept All mode, wherein the first endpoint will accept a packet regardless of the Destination ID that is contained therein.

18. The network according to claim 15, wherein each switch has virtual destination IDs;

wherein the host processor includes a plurality of additional routing paths between each endpoint and each switch using the Virtual Destination IDs; and wherein each switch includes routing table entries for Virtual Destination IDs from endpoints to other switches.

19. The network according to claim 18, wherein the host processor is configured to:
  generate a maintenance packet including a destination ID identical to a first switch's Virtual Destination ID; and
  send the data packet to the first switch to access maintenance registers.

20. The network according to claim 18, wherein the host processor is configured to:
  generate a data packet including a destination ID identical to the host processor's Virtual Destination ID; and
  send the data packet to at least one of the switches;
  whereby the data packet is looped back to the host processor.

* * * * *